United States Patent [19]

Ogura et al.

[11] Patent Number: 5,835,203
[45] Date of Patent: Nov. 10, 1998

[54] VEHICLE LASER RADAR SYSTEM

[75] Inventors: Hiroyuki Ogura; Hidenobu Korenaga, both of Shizuoka, Japan

[73] Assignee: Yazaki Corporation, Tokyo, Japan

[21] Appl. No.: 629,468

[22] Filed: Apr. 10, 1996

[30]  Foreign Application Priority Data

Apr. 11, 1995 [JP] Japan .................................. 7-085334

[51] Int. Cl.⁶ .................................................. G01C 3/08
[52] U.S. Cl. .......................................... 356/5.01; 356/4.01
[58] Field of Search .............................. 356/4.01, 5.01; 392/70, 71

[56]  References Cited

U.S. PATENT DOCUMENTS

5,249,027  9/1993  Mathur et al. ................................ 356/1
5,475,494  12/1995  Nishida et al. ......................... 356/4.06
5,546,086  8/1996  Akuzawa et al. ......................... 342/70
5,563,787  10/1996  Nurayama ........................... 364/424.02
5,565,870  10/1996  Fukuhara et al. ........................ 342/70

Primary Examiner—Mark Hellner
Attorney, Agent, or Firm—Sughrue, Mion, Zinn, Macpeak & Seas, PLLC

[57]  ABSTRACT

In a vehicle laser radar system capable of performing both distance measurements and information communication, only one laser diode is required. A light beam output by a first light emitting section (10) is split and applied through an optical cable to a second light emitting section (14), so that the light beam thus split is emitted from the second light emitting section. A control unit places the laser diode in an operating state for a predetermined period of time, and, when the laser diode is in an operating state, chooses between distance measuring data or communicating data alternately, and causes the laser diode to emit a light pulse according to the data thus chosen.

8 Claims, 10 Drawing Sheets

LASER DRIVING SIGNAL

FIG. 5 (b)

DISTANCE MEASUREMENT PULSE SIGNAL

(1KHz)

← CHANGEABLE ON COMMUNICATION DATA

FIG. 5 (c)

COMMUNICATION PULSE SIGNAL

← IN THIS CHART, ON-OFF STATE DEPENDING UPON DISTANCE MEASUREMENT SIGNAL

TIME →

FIG. 5 (d)

RECEIVING SECTION

VEHICLE LASER RADAR SYSTEM

BACKGROUND OF THE INVENTION

1. Field of the Invention

The present invention relates to a laser radar system for a vehicle (hereinafter referred to as a "vehicle laser radar system"), and more particularly to a vehicle laser radar system having a simplified structure as compared to conventional vehicle laser radar systems.

2. Related Art

Figure 9:
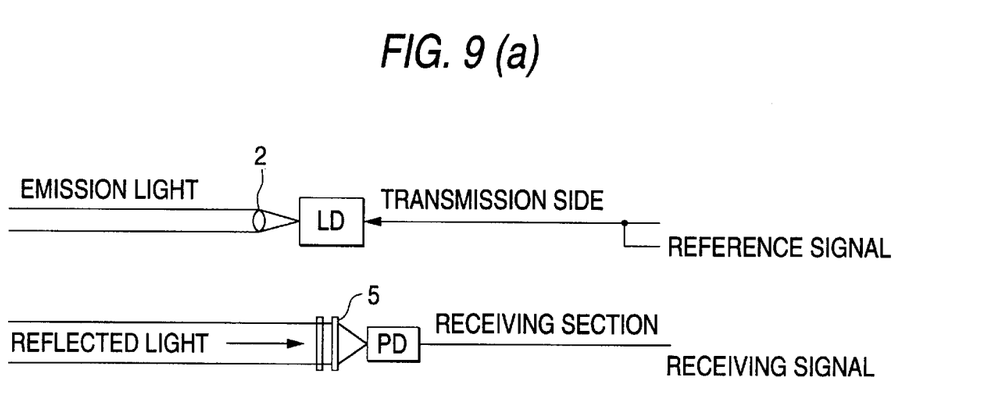
FIGS. 9(a) and 9(b) respectively illustrate the arrangement and operation of a conventional vehicle laser radar system, and the signals transmitted and received in the conventional vehicle laser radar system.

Generally, in vehicle laser radar systems, a laser diode 1 emits a laser pulse beam (hereinafter referred to merely as a "pulse beam") through a transparent lens 2, as shown in FIG. 9(*a*). When the path of the pulse beam is obstructed by an object such as a vehicle, the pulse beam is returned, as a reflection pulse beam, through an optical filter 5 and it is detected by a photo-diode PD 3.

Referring to FIG. 9(*b*), a time difference τ, between a reference signal (hereinafter referred to as a "restoration signal") and a light reception signal, which correspond to the emission of the laser pulse beam, is obtained. The distance D from the laser diode 1 to the object or vehicle is obtained according to the following expression:

$$\text{Distance } D(m) = 300{,}000(Km \times s) \times \tau(s)/2 = \tau(ns)/6{,}667(ns/m)$$

The distance thus obtained is displayed on a display unit of the vehicle laser radar system. When the distance is extremely short, for example, a warning signal is produced.

Figure 10:
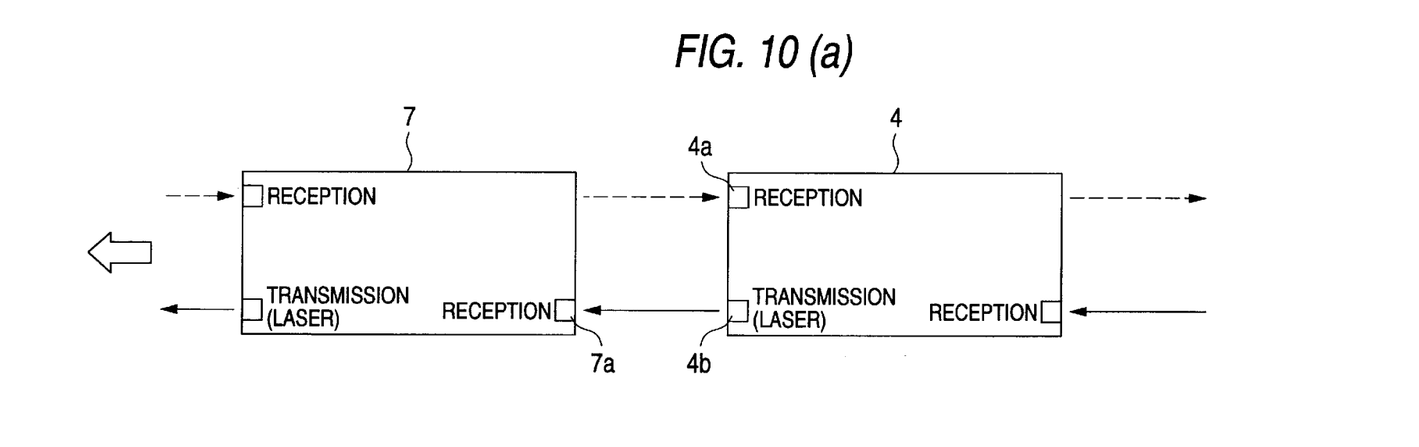
FIGS. 10(a) and 10(b) illustrate the arrangement and operation of recent vehicle laser radar systems.

Recently, a vehicle laser radar system has been proposed which is able to measure the distance between the vehicle and an object or another vehicle, and which is able to transmit and receive signals to and from the front or rear vehicles. For example, FIG. 10(*a*) shows a one-way laser radar system which transmits information from a first vehicle 4 to a second vehicle 7 in front of the first vehicle 4. That is, in the case shown in FIG. 10(*a*), each of the two vehicles has a one-way laser radar system.

In the one-way laser radar system, a pulse beam emitted from the first vehicle 4 is reflected from the second vehicle 7, and received by a light receiving section 4*a* in the first vehicle. The distance from the first vehicle 4 to the second vehicle 7 is measured based upon the reflected light. At the same time, the emitted pulse beam is received by a signal receiving section 7*a* mounted on the rear of the second vehicle so that the latter measures the distance to the first vehicle.

In order to avoid collisions, the first vehicle 4 should be able to detect the movement of the second vehicle 7; that is, it should be able to detect when the second vehicle turns to the right or to the left, decelerates, or stops. For this purpose, the system shown in FIG. 10(*b*) is provided. In this system, each of the vehicles has a signal transmitting section and a signal receiving section both on the front and on the rear, so that the light receiving section on the front of a first vehicle receives information from a second vehicle located in front of the first vehicle, and the signal transmitting section on the rear of the first vehicle transmits information to a third vehicle at the rear of it.

Presently, laser radar systems are available which not only measure distance but which also communicate information to other vehicles. Laser radar systems of this type have a variety of light emitting devices. In some of these laser radar systems, in order to avoid interference between communication signals, the distance measuring operation and the signal communicating operation are carried out separately. However, this method is not preferable, because it requires a plurality of devices. In addition, it is necessary to switch between the distance measuring mode and the signal communicating mode, such that the distance measuring operation is suspended when the distance measuring mode is switched over to the signal communicating mode.

In order to overcome this difficulty, Unexamined Japanese Patent Publication Hei. 5-13000 has disclosed a collision preventing device designed as follows: Each vehicle has signal transmitting and receiving sections, respectively, on the front and on the rear. A communication protocol for the cycle of control of the signal transmitting and receiving sections on the front and on the rear of the vehicles is determined by using a format made up of a plurality of bits. The front half of the format is employed for the front half mode, and the rear half for the rear half mode. That is, for every control cycle of signal emission, the signal transmitting and receiving section on the front of a first vehicle is driven according to the front mode of the format to measure the distance to a second vehicle located in front of the first vehicle. Next, according to the rear half mode, a pulse beam, which is different in pulse width from that used in the front half mode, is used to measure the distance to a third vehicle located behind the first vehicle.

However, laser diodes are expensive. Hence, the installation of laser diodes on the front and rear of a vehicle is one of the factors which increases the manufacturing cost of a conventional vehicle laser radar system.

Moreover, in the case of a laser radar which is so designed as to be able to communicate information as well as to measure distances, it is necessary to provide a plurality of signal transmitting and receiving devices. This is not economical. In addition, when a signal transmitting and receiving device is used not only to measure distances but also for communication, the distance measurement is suspended while the distance measuring mode is switched over to the communication mode.

In some of the systems in which the signal transmitting and receiving sections are provided on the front and rear of each vehicle, and the distance measurement and communication are carried out every emission control cycle, digital codes are obtained according to the difference in pulse width of light, to perform the distance measurement and the communication. However, it should be noted that the pulse beam is changed in configuration even by dust, steam, etc., in the air.

The data on the distance and other information are received through the pulse beams emitted from one and the same signal transmitting section (for instance, mounted on the rear of the second vehicle running in front of the first vehicle). Hence, the data on the distance is scarcely affected by changes in the pulse beam. However, because the pulse beam is changed in width, rise and fall, the transmission of information is adversely affected.

Furthermore, such a system is disadvantageous in that, by varying the emission time of a pulse beam, the pulse width is changed to indicate "1" and "0" levels, which requires intricate control of the laser driver.

In addition, as was described above, "1" and "0" levels are indicated by changing the pulse width. Hence, in the case when a pulse beam large in pulse width is emitted at a short distance of 10 meters or less, the distance resolution is low.

SUMMARY OF THE INVENTION

An object of the present invention is to solve the above-described problems. More specifically, an object of the present invention is to provide a vehicle laser radar system having simple construction and which is able to communicate information without suspension of the distance measurement operation, and which uses only one laser diode for communication.

The foregoing object of the present invention is achieved by the provision of a vehicle laser radar system comprising:

a plurality of light transmitting and receiving sections mounted on a vehicle, each of which includes a light emitting section and a light receiving section; and a control unit for controlling the light transmitting and receiving sections.

The system according to the present invention further comprises a light transmitting device which splits a light beam emitted from a first one of the light emitting sections to supply a light beam to a second one of the light emitting sections, so that a single light source provides for the output of light from both the first and the second light emitting sections. The second light emitting section includes an LED.

Furthermore, in the vehicle laser radar system according to the present invention, the control unit includes a signal reception data calculating circuit which, performs a distance measurement based upon a time difference of a restoration signal of an emitted light beam and light received from one of the light receiving sections. In addition, the signal reception data calculating circuit determines the contents of a communication signal. The control unit further includes an emission data control circuit which places the laser diode in an operating state for a predetermined period, and, when the laser diode is in an operating state, chooses between distance measuring data or communication data alternately, and causes the laser diode to emit a light pulse according to the data thus chosen.

Moreover, in the vehicle laser radar system of the present invention, the communication data is selected after the received signal is converted into communication data according to a predetermined communication protocol.

In the vehicle laser radar system according to the present invention, the light transmitting means operates to split a light beam emitted from a first light emitting section and to transmit a split light beam to a second light emitting section, so that the light beam thus split is emitted from the second light emitting section. The second light emitting section includes the LED, so that an additional laser is not required.

In the vehicle laser radar system, the signal transmitting and receiving section is made up of the light transmitting section having a laser diode, and the light receiving sections for receiving light beams. The emission data control means of the control unit places the laser diode in an operating state for a predetermined period of time, and in this case the distance measuring data and the communication data are selected alternately. A pulse light is emitted from the laser diode separately according to the data thus selected. Hence, the pulse light can be used not only for distance measurement but also for communication. The signal reception data calculating means determines the result of the distance measurement or the content of the communication.

In the case where no communication is carried out, the distance measuring pulse light is emitted at all times.

DETAILED DESCRIPTION OF THE PREFERRED EMBODIMENTS

First Embodiment

Figure 1:
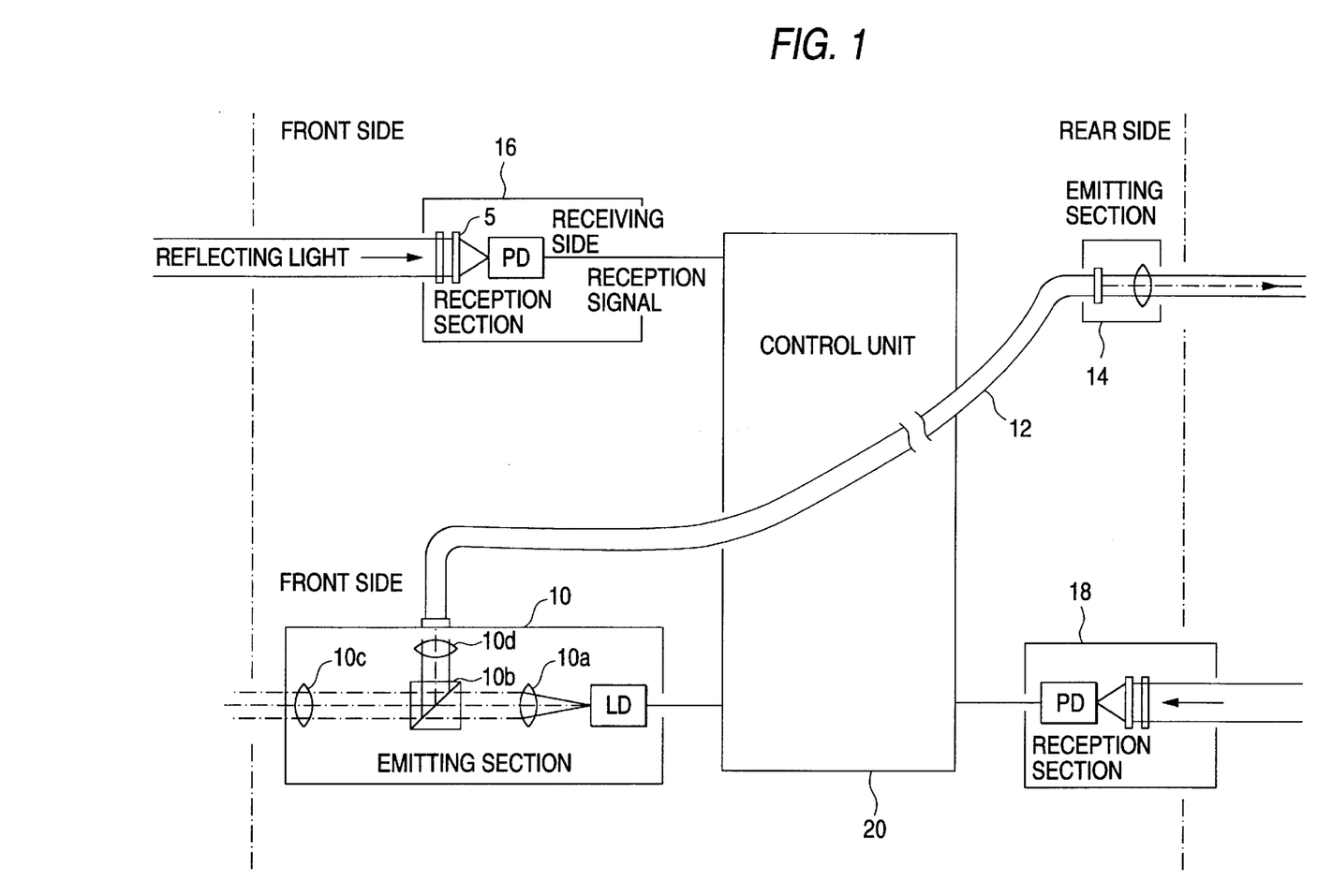
FIG. 1 illustrates the arrangement of a vehicle laser radar system, which constitutes a first embodiment of the invention.

FIG. 1 illustrates the arrangement of a vehicle laser radar system, which constitutes a first embodiment of the invention. In FIG. 1, reference numeral 10 designates a light emitting section mounted on the front of a first vehicle 4 (hereinafter referred to as "front light emitting section 10"). The light emitting section 10 operates to emit a laser beam from a laser diode LD 10e. The laser beam thus emitted is advanced to the front of the vehicle through a lens 10a, an optical beam spitter 10b, and a lens 10c. The beam spitter 10b is a prism, for example. The laser beam processed by the beam spitter 10b is applied through a lens 10d to a light emitting section 14 on the rear of the vehicle (hereinafter referred to as "rear light emitting section 14") via an optical cable 12. Thus, light is emitted at the rear of the vehicle. The rear light emitting section 14, unlike the front light emitting section 10, has no laser diode.

Further in FIG. 1, reference numeral 16 designates a light receiving section mounted on the front of the vehicle (hereinafter referred to as "front light receiving section 16"). The front light receiving section 16 is arranged parallel to the front light emitting section 10. The front light receiving section 16 receives reflected light from an object in front of the vehicle. The received light is converted into an electrical signal, which is output as a light reception signal. Reference numeral 18 designates a light receiving section mounted on the rear of the vehicle (hereinafter referred to as "rear light receiving section 18"). The rear light receiving section 18 receives a pulse beam, and converts it into an electrical signal, which is also output as a light reception signal.

Reference numeral 20 denotes a control unit. The control unit 20 is adapted to control the signal transmission and reception timing of the front light emitting section 10, the rear light emitting section 14, the front light receiving section 16, and the rear light receiving section 18. For this purpose, the control unit 20 provides, for example, a pulse beam 100 ns in pulse width every kilo-hertz (kHz) according to a predetermined communication format.

As is apparent from the above description, the output pulse beam of the front light emitting section 10 is transmitted through the optical cable 12 to the rear light emitting section 14, so that it is emitted from the back of the vehicle. Thus, with only one laser diode, the laser beam is emitted both from the front and the back of the vehicle. The single laser diode together with the front and rear light receiving sections enable the first vehicle to transmit and receive signals to and from a second vehicle located in front of the first vehicle and a third vehicle located at the rear of the first vehicle.

In the above-described first embodiment, the pulse beam from the front light emitting section is led to the rear of the vehicle. However, in the case where the system is modified so that the rear light emitting section has a laser diode, the front light emitting section 10 in FIG. 1 may be replaced with the rear light emitting section 14 in FIG. 1. Furthermore, the system may be modified so that the pulse beam is led not only to the front of the vehicle but also laterally.

Moreover, in the above-described embodiment, the pulse beam is led to the front and the rear of the vehicle at all times; however, the invention is not limited thereto. That is, a change-over control may be employed so as to lead the light beam to the front only or to the rear only, as the case may be. For example, the following means may be employed. In order to emit the laser beam only to the front of the vehicle, the optical beam spitter is removed; and in order to emit the laser beam only to the rear of the vehicle, a mirror is used to lead the pulse beam from the lens 10a to the optical cable 12.

As is apparent from the above description, the number of expensive laser diodes is reduced to one, which simplifies the structure and reduces the manufacturing cost of the system.

Second Embodiment

Figure 2:
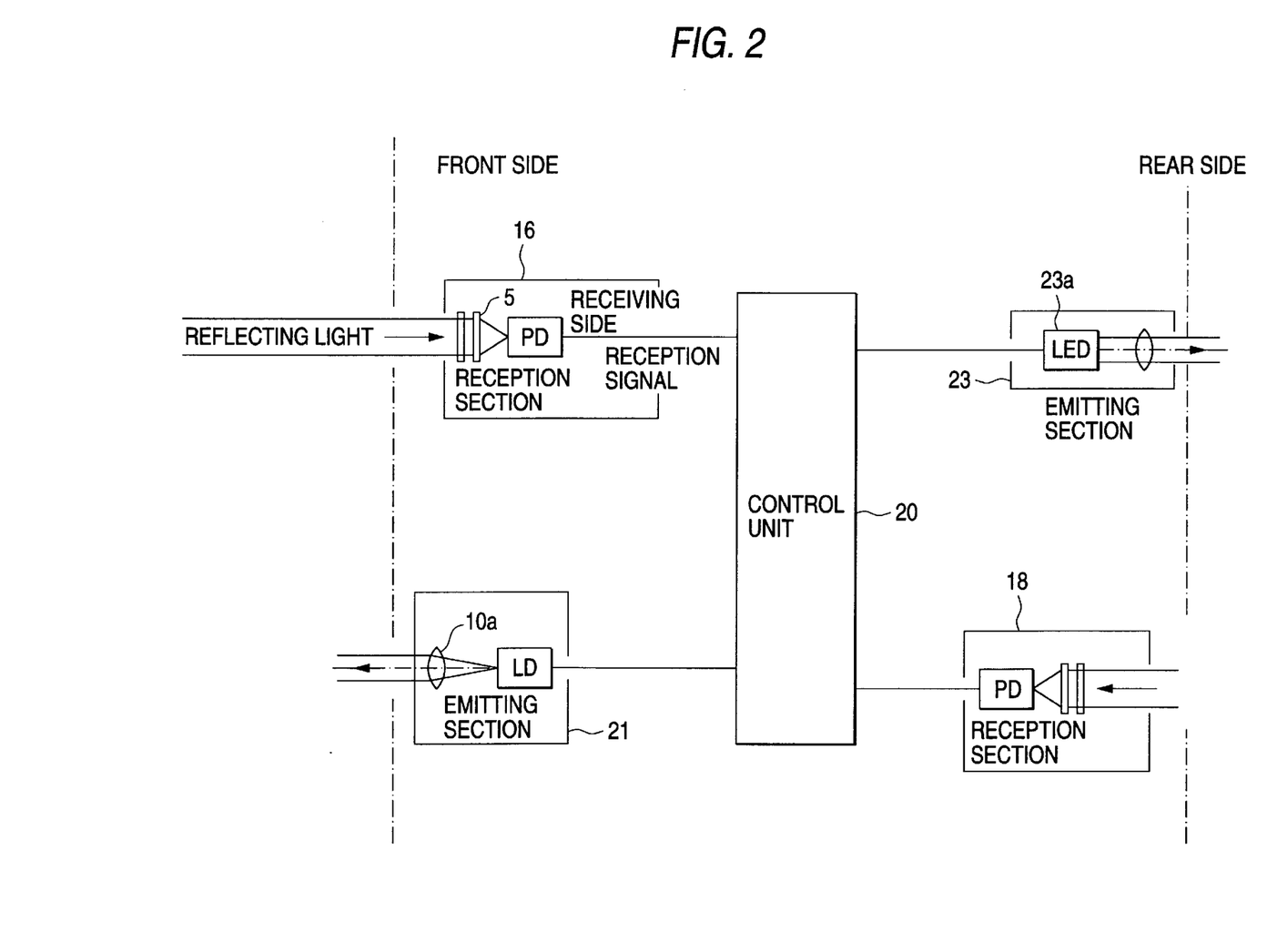
FIG. 2 illustrates the arrangement of the vehicle laser radar system, which constitutes a second embodiment of the invention.

FIG. 2 illustrates another example of the vehicle laser radar system, which constitutes a second embodiment of the invention.

In FIG. 2, reference numerals 16 and 18 designate a front light receiving section and a rear light receiving section which are the same as those in the first embodiment (FIG. 1). The light emitting section 21 according to the second embodiment is different from that in the first embodiment in that it does not have an optical beam spitter (described with reference to FIG. 1); that is, the front light emitting section 21 is so designed as to emit a pulse beam only to the front of the vehicle.

Further in FIG. 2, reference numeral 23 designates a rear light emitting section having an LED 23a. In section 23, the LED 23a is turned on and off in response to control signals from the control unit 20, thereby transmitting optical information from the back of the first vehicle.

The reason why the rear light emitting section 23 includes the LED 23 instead of the laser diode is that the passage of the vehicle indicates that there is no obstruction, and therefore, it is unnecessary to perform a distance measurement. Hence, no reflected laser beam is required (in the case of a motor vehicle, the laser beam being such that it is able to go and return 100 m to 150 m in maximum). If it is necessary to measure the distance, data on the distance should be transmitted from a third vehicle located behind the first vehicle. Therefore, according to the invention, it is unnecessary to use more than one laser diode. Thus, the vehicle laser radar system according to the second embodiment of the invention is simple in arrangement, and low in manufacturing cost.

Figure 3:
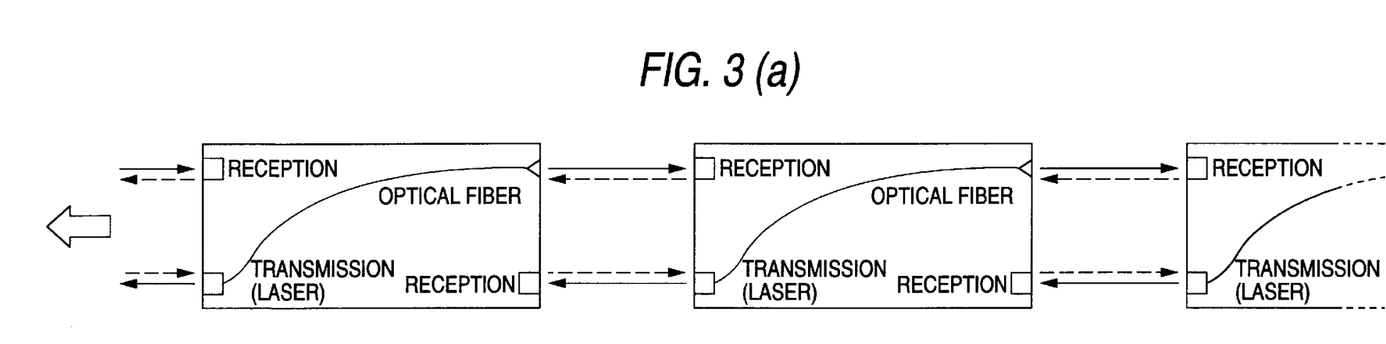
FIGS. 3(a) and 3(b) illustrate the vehicle laser radar system of the present invention which is applied to an automatic traveling traffic system.

Installation of the vehicle laser radar system according to the first embodiment or the second embodiment on a plurality of vehicles as shown in FIGS. 3(a) and 3(b), is considerably effective for vehicles traveling along roads provided with automatic traveling traffic systems for automatically controlling the vehicles.

Third Embodiment

A third embodiment of the invention relates to the control of the transmission and reception of a laser pulse beam. According to this embodiment, one laser diode and one photo-diode are employed to perform the distance measurement and the transmission and reception of signals. In the third embodiment, the arrangement at the back of the vehicle is similar to the front arrangement. Therefore, only the front arrangement will be described.

Figure 4:
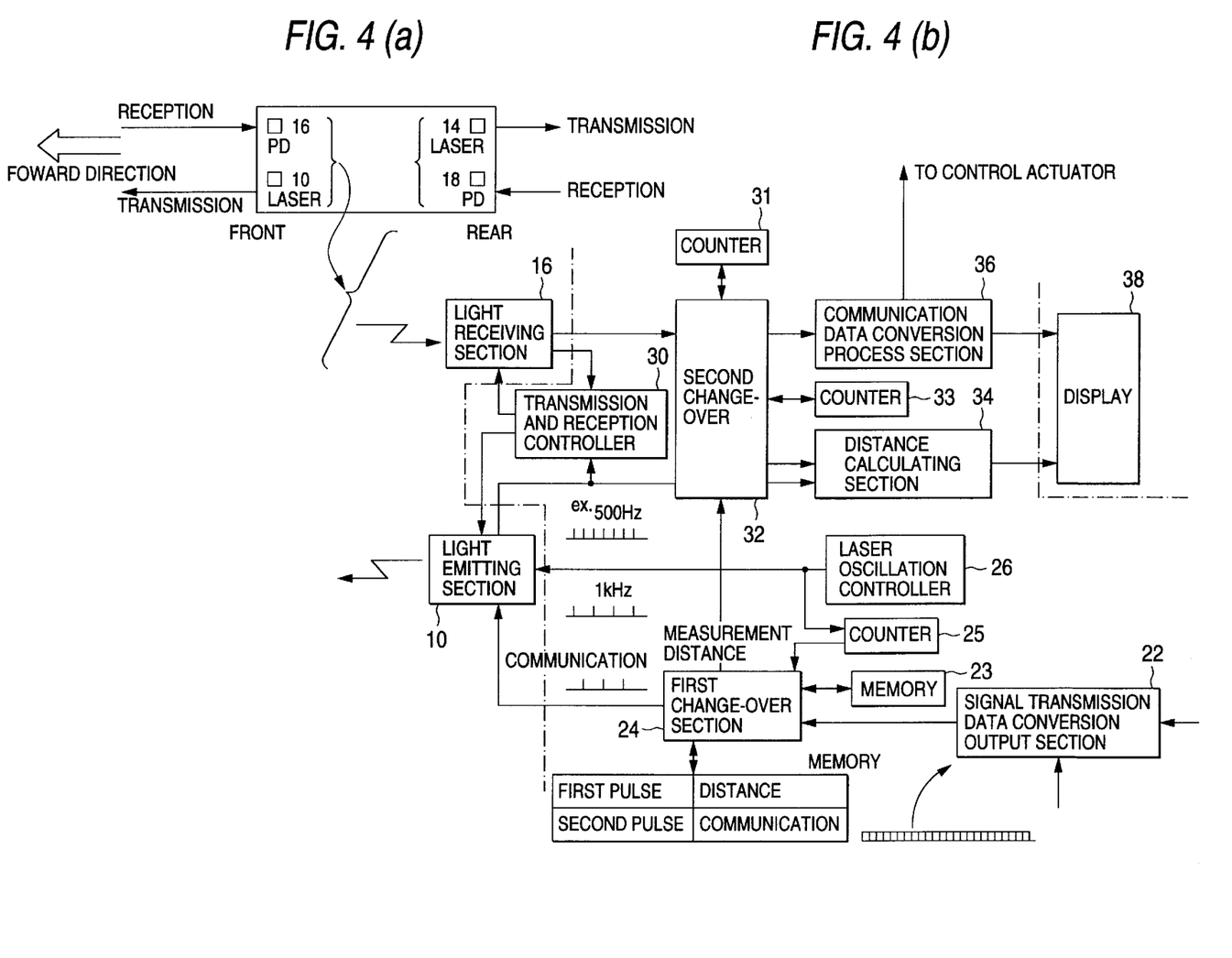
FIGS. 4(a) and 4(b) are block diagrams outlining the arrangement of the vehicle laser radar system which constitutes a third embodiment of the invention.

The third embodiment is designed as shown in FIGS. 4(a) and 4(b). In FIG. 4(b), components 10 and 16 are the same as those which have been described above. Further in FIG. 4(b), reference numeral 22 designates a signal transmission data conversion output section which operates as follows. When a signal is received, the signal transmission data conversion output section 22 sets a communication flag in a first change-over section 24 which indicates the presence of a received signal, and thereafter reads the signal transmission data (motion data), and converts it into communication data according to a predetermined communication protocol. The communication data is supplied to the first change-over section 24.

The operation of the aforementioned first change-over section 24 will now be described.

When the communication flag is set, the first change-over section 24 activates a counter 25 which counts pulses of a signal supplied from a laser oscillation controller 26. When the count value is "1" (the first pulse) according to the contents set in a memory (not shown), it is determined that the pulse beam is to be used for a distance measurement (hereinafter referred to as "distance mode"). The first change-over section 24 supplies, to the light emitting section 10, distance measuring data set in the memory, and informs a second change-over section 32 of the activation of the distance mode.

When the count value is "2" (the second pulse), according to the contents of the memory, it is determined that the pulse beam is to be used for communication (hereinafter referred to as "communication mode"). Communication data from the communication data conversion output section 22 is supplied to the light emitting section 10. The aforementioned counter 25 is reset (cleared) whenever it counts two drive pulses from the laser oscillation controller 26.

The laser oscillation controller 26 forms a drive pulse signal (of 500 Hz, for example), according to a reference frequency (of 500 Hz, for instance), which is used to drive the laser diode LD 10e in the light emitting section 10. The light emitting section 10 supplies a signal to a signal transmission and reception controller 30 to indicate drive timing. Hence, the counter 25 is reset every kilo-hertz (kHz).

The signal transmission and reception controller 30 supplies power to the light emitting section 10 whenever the laser oscillation controller 26 outputs the drive signal to the light emitting section 10, so that the light emitting section 10 is placed in a standby state. Furthermore, in response to a drive signal, the controller 30 places the light emitting section 10 in an operating state for a predetermined period of time. For example, if, in the case where the detection capacity is 100 m in maximum, the emitted pulse beam width is of the order of 50 nsec, the period of time may be 670 nsec; however, it is set to about $1\mu$ for tolerance.

In FIG. 4(b), reference numeral 32 designates a second change-over section. Whenever a light reception signal is supplied from the light receiving section 16 to the second change-over section 32, the latter 32 causes a counter 31 to begin counting. When the count value is "1", the system is determined to be in the distance mode, and the second change-over section 32 supplies a signal representing the intensity of received light to a distance calculating section 34. When the count value is "2", the system is determined to be in the communication mode, and the second change-over section 32 supplies a signal representing the intensity of received light to a communication data receiving section 36.

Upon receipt of a reference signal for the light emitting section 10, the second change-over section 32 activates a counter 33. When the count value is "1", the system is in the distance mode, and the second change-over section 32 supplies the reference signal to the distance calculating section 34. When the count value is "2", the system is in communication mode, and the second change-over section 32 suspends the supply of the reference signal. The supply of the reference signal is suspended for the following reason. The drive signal from the laser oscillation controller 26 is supplied at 500 Hz. If, when the drive signal is supplied, there is no data to be transmitted, no laser beam is emitted. However, when the laser beam is emitted for some reason, the distance measurement may be erroneous.

The counters 31 and 33 for counting the number of times that light reception signals are produced, are operated when the laser oscillation controller 26 outputs the drive signal. Each counter is cleared when the counter value reaches "2".

The distance calculating section 34 operates in the following manner. The distance calculating section 34 places the reference signal from the second change-over section 32 and the light reception signal on one and the same time axis to obtain the time difference between the signals. The time difference is used to determine the distance, which is then stored in memory. The average of the distances thus stored is displayed, as an inter-vehicle distance, on a display section 38.

The communication data conversion process section 36 determines the communication data provided by the second change-over section 32, and when necessary, converts the communication data into a signal for controlling a variety of controlling actuators to activate the latter, or converts it into a message, which is displayed on the display section 38. In the case where the same data is received continuously a predetermined number of times, that pulse is determined as "1" (or "0").

The control unit is made up of the above-described elements (as shown in FIG. 1) except the display section 38, the light emitting section 10, and the light receiving section 16. The circuit elements 22 through 30 form an emission data control section, and the circuit elements 31 through 36 form a signal reception data calculating means.

Now, the operation of the third embodiment will be described. FIGS. 5(a)–5(d) illustrate timing diagrams for a description of the operation of the third embodiment.

Figure 5A:
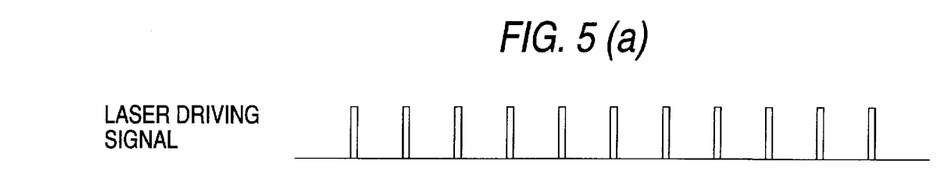
FIGS. 5(a)–5(d) are timing diagrams for description of the operation of the third embodiment of the invention.

As shown in FIG. 5(a), for example, as the vehicle travels, the laser oscillation controller 26 supplies a laser drive signal (500 Hz) to the light emitting section 10 to drive the laser diode LD 10e.

Figure 5B:
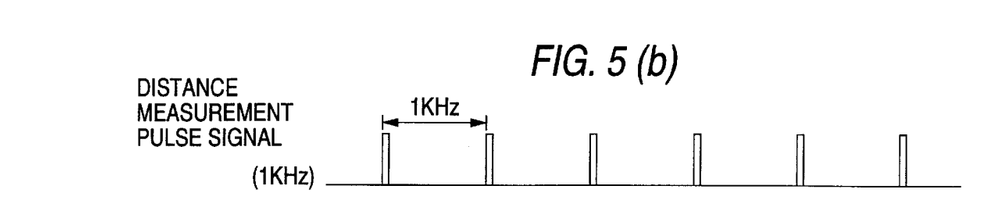

In the case where the first change-over section 24 is in the distance mode, whenever the laser drive signal count value of the counter 25 reaches "1", the first change-over section 24 supplies, from memory, a reference signal to the light emitting section 10, to cause the latter 10 to emit the corresponding pulse beam. That is, if the period of the laser drive signal is 500 Hz, then as shown in FIG. 5(b) a distance-measuring pulse signal is emitted with a period of 1 kHz.

In response to this reference signal; the light receiving section 16 is placed in an operating state (1 μsec). Therefore, the light receiving section 16 receives the distance-measuring pulse signal (reflection signal). The signal thus received is supplied to the second change-over section 32, so that it is transmitted to the distance calculating section 34, where the distance is calculated.

Figures 5C, 5D:
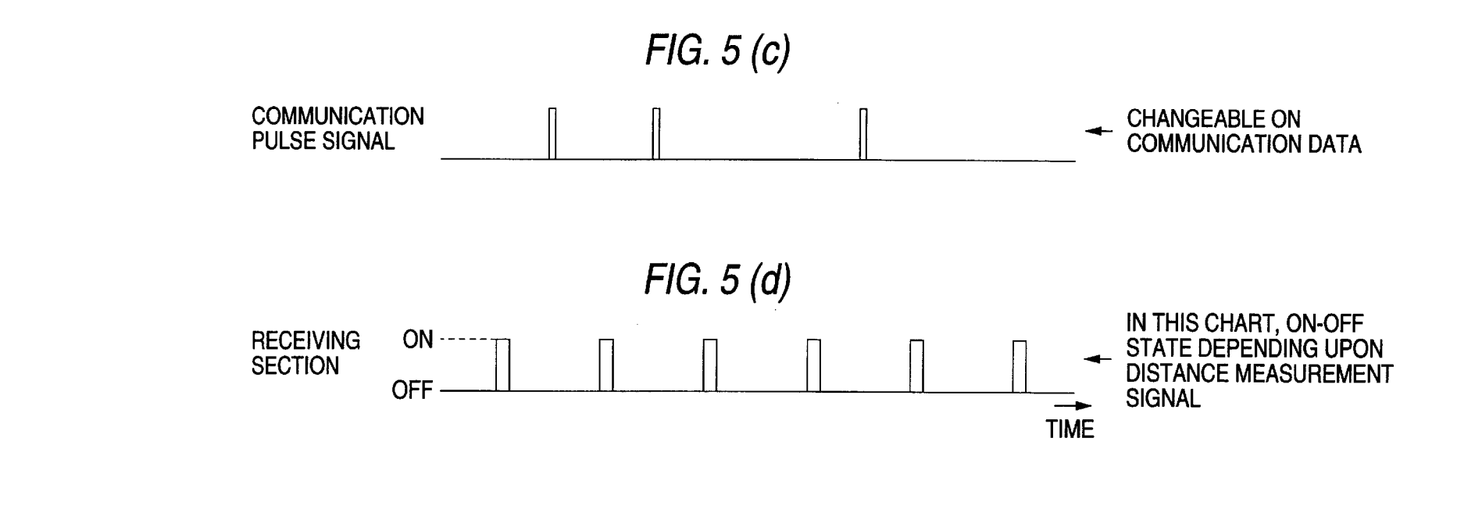

When the first change-over section 24 is in the communication mode and the laser drive signal count value of the counter 25 reaches "2", the first change-over section 24 transmits the communication data of the communication data conversion output section 22 to the light emitting section 10, so that the latter 10 outputs the corresponding pulse beam.

Figure 6:
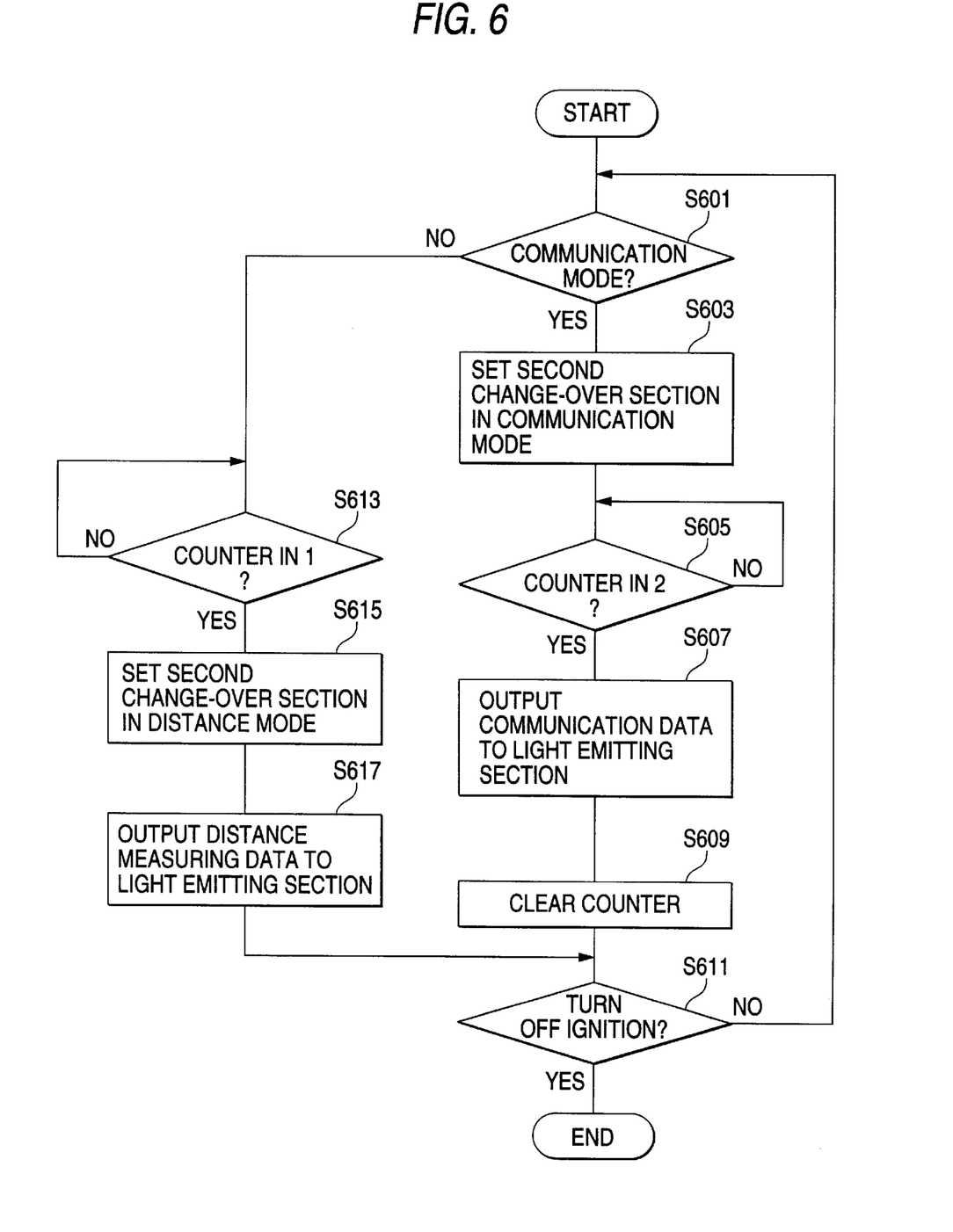
FIG. 6 is a flow chart for a description of the operation of a first change-over section in the third embodiment of the invention.

Now, the operation will be described with reference to a flow chart of FIG. 6. That is, the chart of FIG. 6 is for a description of the operation of the first change-over section in the third embodiment.

First, it is determined whether or not the communication flag has been set, thereby to determine whether or not the first change-over section 24 is in the communication mode (Step S601). When the first change-over section 24 is in the communication mode, the second change-over section 32 is placed in the communication mode (Step S603). Next, it is determined whether or not the count value of the counter 25 is "2" (Step S605). When it is "2", then the communication data of the communication data conversion output section 22 is read by the first change-over section 24 and supplied to the light emitting section 10 (Step S607), and the counter 25 is cleared (Step S609). Thereafter, it is determined whether or not the ignition is turned off (Step S611). If it is not off, Step S601 is effected again.

In the case where, in Step S601, it is determined that the system is not in the communication mode, it is determined whether or not the counter value of the counter 25 is "1" (Step S613). When it is "1", then the second change-over section 32 is placed in the distance mode (Step S615), and distance measuring data is supplied to the light emitting section 10 (Step S617), and Step S611 is effected.

Figure 7:
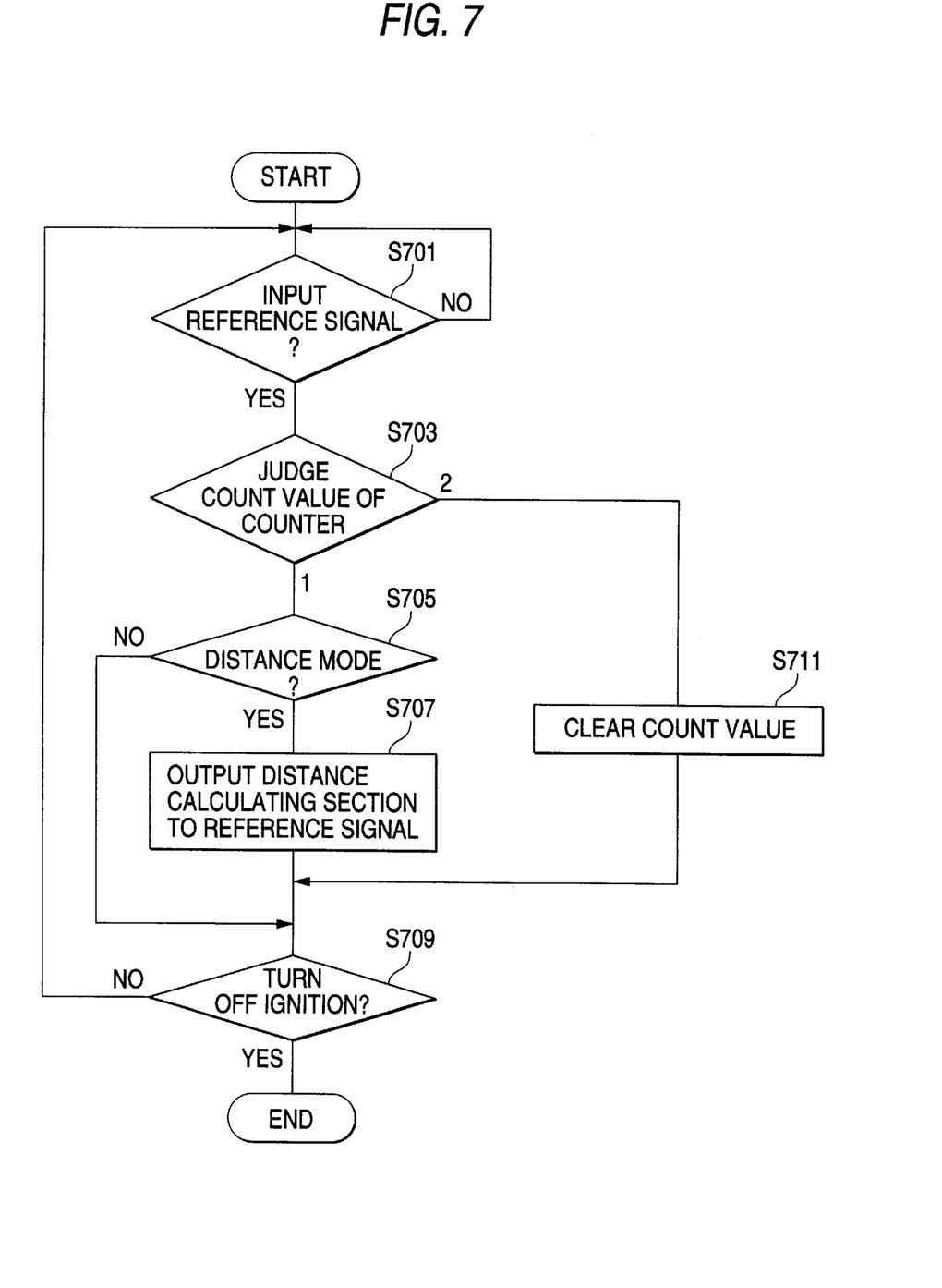
FIGS. 7 and 8 are two parts of a flow chart for a description of the operation of a second change-over section in the third embodiment of the invention.
Figure 8:
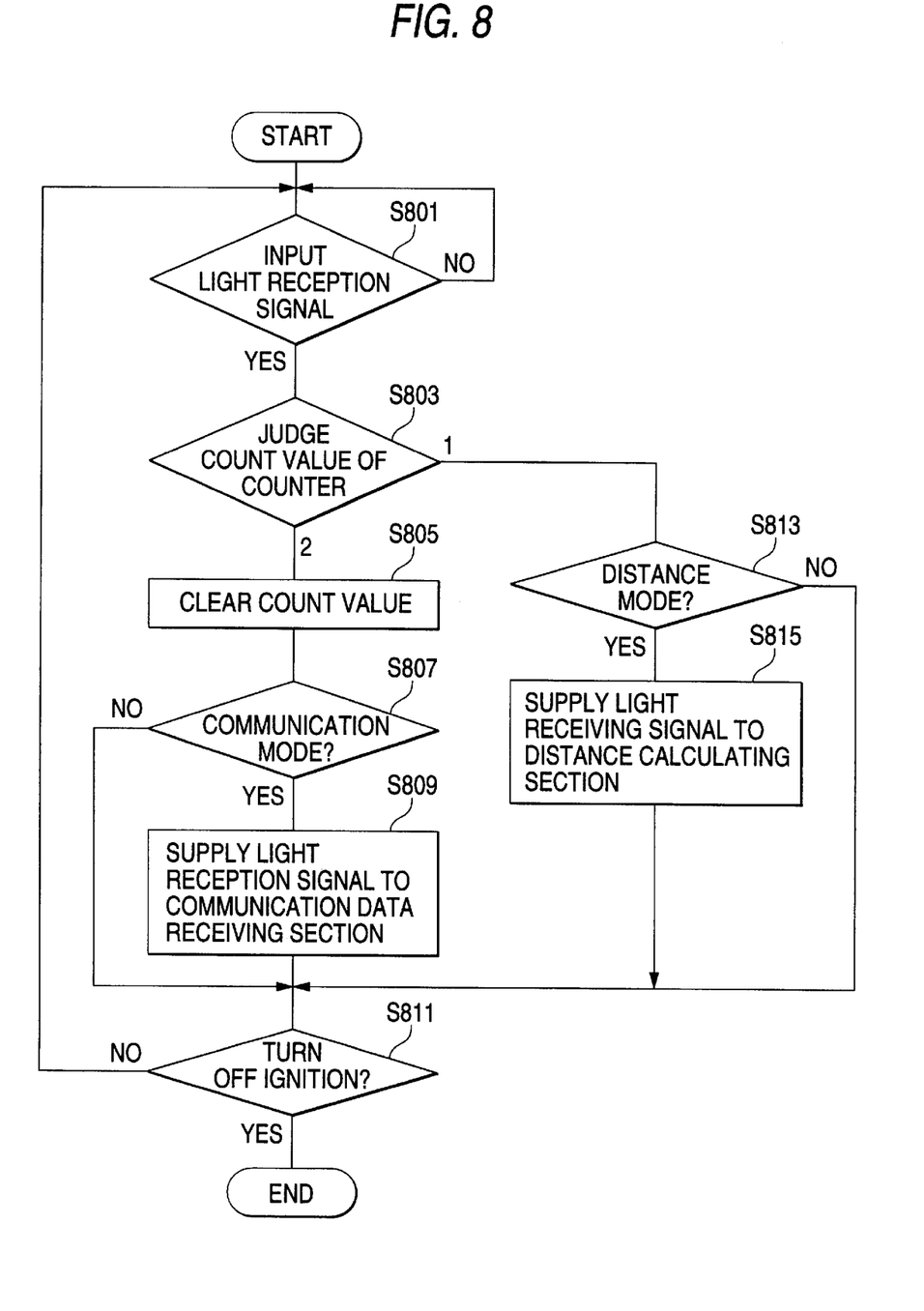

FIGS. 7 and 8 are two parts of a flow chart for a description of the operation of the second change-over section 32. The flow chart is divided into two parts (FIGS. 7 and 8) as conducive to a full understanding of the invention.

It is determined whether or not the reference signal is input (Step S701) to the distance calculating section 34. When it is determined that the reference signal is input, it is determined whether the count value of the counter 33 is "2" or whether it is "1" (Step S703). When it is "1", it is determined that the system is in the distance mode (Step S705). When it is in the distance mode, the reference signal input to the distance calculating section 34 is output (Step S707). Then, it is determined whether or not the ignition is off (Step S709). When the ignition is not off, Step S701 is effected again.

Where, in Step S703, the count value is "2", the counter 33 is cleared, and Step S709 is effected.

Now, the operation of the second change-over section will be described with reference to FIG. 8.

First, it is determined whether or not the light reception signal is available (Step S801). When the light reception signal is available, the count value of the counter 31 is read (Step S803). When the count value of the counter 31 is "2", the counter is cleared (S805). Thereafter, it is determined whether or not the system is in the communication mode (Step S807). When the communication mode is effected, the light reception signal is supplied to the communication data receiving section 36 (Step S809). Next, it is determined whether or not the ignition is off (Step S811). When the ignition is not off, Step S811 is effected.

On the other hand, when the count value of the counter 31 is "1", whether or not the distance measuring mode is effected or not (Step 813). If the distance measuring mode is effected, the receiving signal is supplied to the distance measuring section (Step 815) to move the control to step 811.

As is apparent from the flow chart of FIGS. 7 and 8, the laser diode is driven for a predetermined period of time to emit the pulse beams, and the pulse beams thus emitted are employed alternately for distance measurement and for communication. Those pulse beams are reflected, and received alternately and continuously for distance measurement and for communication. However, in order to distinguish the pulse beam for distance measurement and the pulse beam for communication from each other, the pulse beams are emitted with different modes set up, and are determined according to the count values of the counters. Hence, a pulse beam to be used for communication will never be mistaken for the pulse beam to be used for distance measurement.

In the prior art, in order to distinguish the pulse beam for communication and the pulse beam for distance measurement from each other, those pulse beams are different in pulse width. On the other hand, with the above-described embodiment, the decision is made in the above-described manner, and no pulse width changing means or pulse width setting means is required.

In the above-described third embodiment, the first pulse beam is employed for distance measurement; however, the invention is not limited thereto or thereby. That is, the first pulse beam may be employed for communication.

In addition, the rear light emitting section may be replaced with an optical cable or an LED.

Further, the front and rear system is controlled by the same controller. However, it would be occurred that the front and rear system receive the data, respectively, which are different from each other. In this case, it is necessary to forward data processing of the front and rear system, independently.

As is apparent from the above description, a light beam emitted from a first one of the light emitting sections is split and transmitted to a second one of the light emitting sections, so that the light beam thus split is output by the second light emitting section. Hence, even if a plurality of light emitting sections are employed, the number of light sources is only one. This feature eliminates the difficulty that a plurality of drive circuits must be provided for operating a plurality of lasers. Hence, the vehicle laser radar system according to the present invention is simple in arrangement, and low in manufacturing cost.

Instead of using a light transmitting means, the second light emitting section includes a light emitting element. This feature makes it unnecessary to provide a communicating laser and accordingly a drive circuit for it, which makes the system of the invention simple in arrangement and low in manufacturing cost.

In the vehicle laser radar system of the invention, the signal transmitting and receiving section is made up of the light transmitting section having a laser diode, and the light receiving section. The laser diode is placed in an operating state for a predetermined period of time, and, when the laser diode is in the operating state, the distance measuring data and the communicating data are alternately selected, and the laser diode is caused to emit a light pulse according to the data thus selected. Hence, the pulse light thus emitted can be used not only for distance measurement but also for communication. This means that it is unnecessary to provide two lasers, namely a distance measuring laser and a communicating laser. That is, one signal transmitting and receiving section can handle both the distance measuring operation and the communicating operation. In addition, with only one laser, the distance measuring operation and the communicating operation can be performed alternately. That is, the distance measurement will never be suspended.

In the case where no communication is carried out, only the distance measuring pulse light is emitted.

What is claimed is:

1. A vehicle laser radar system comprising:
   a plurality of light transmitting and receiving devices mounted on a vehicle, each of said light transmitting and receiving devices comprising a light emitting section and a light receiving section;
   control means for controlling each of said light transmitting and receiving devices; and
   light transmitting means for splitting and transmitting a light beam, supplied from a light source arranged in a first one of said light emitting sections to a least a second one of said light emitting sections, said light beam thus split being emitted from said second one of said light emitting sections as well as from said first one of said light emitting sections.

2. The vehicle radar system as claimed in claim 1, wherein said second one of said light emitting sections comprises a light emitting diode (LED).

3. The vehicle laser radar system as claimed in claim 1, wherein said control means comprises:
   emission data control means for determining an operation state of said vehicle laser radar system, said operation state being one of a distance measurement mode and a communication mode, for activating said light source in said first light emitting section for a predetermined period of time, for initiating the supply of predetermined distance measuring data to said first light emitting section during said distance measurement mode, and for supplying communication data, received by said emission data control means, to said first one of said light emitting sections; during said communication mode;
   said distance measurement mode and said communication mode being activated alternately, said first one of said light emitting sections outputs one of said predetermined distance measuring data and said communication data based upon said operation state;
   wherein each of said light receiving sections outputs a light reception signal when received light is detected; and
   signal reception data calculating means for receiving a light reception signal from any one of said light receiving sections, for calculating a distance measurement, during distance measurement mode, based upon a time difference between a restoration signal, corresponding to a light beam emitted in accordance with said predetermined distance data, and for determining the contents of communication data of a light reception signal received by said signal reception data calculating means.

4. The vehicle laser radar system as claimed in claim 3, wherein said emission data control means comprises:
   a signal data conversion output device for receiving signal transmissions and for outputting communication data; and
   a first change-over device, connected to said signal data conversion output device, for receiving said communication data from said signal data conversion output device and for determining said operating state of said vehicle laser radar system, said first change-over device supplies said predetermined distance data to said first one of said light emitting sections during said distance measurement mode and supplies said communication data to said first light emitting section during said communication mode.

5. The vehicle laser radar system as claimed in claim 4, wherein said emission data control means further comprises:

a laser oscillating controller which supplies a drive signal to said first one of said light emitting sections; and a signal transmission and reception controller, connected to said first one of said light emitting sections, for activating said first one of said light emitting sections.

6. The vehicle laser radar system as claimed in claim 5, wherein said emission data control means further comprises:

a counter for counting pulses of a signal output by said laser oscillation controller, wherein said first change-over device determines said operation state of said vehicle laser radar system based upon a count value of said counter.

7. The vehicle laser radar system as claimed in claim 3, wherein said signal reception data calculating means comprises:

a second change-over device for receiving a light reception signal from at least one of said light reception sections and for outputting a signal representing an intensity of received light;

a distance calculating device, connected to said second change-over device, for obtaining a distance measurement based upon said signal supplied from said second change-over device during said distance measurement mode and said reference signal supplied to said distance calculating device from said first one of said light emitting sections via said second change-over device; and a communication data receiving device, connected to said second change-over device, for obtaining said communication data from said signal, supplied from said second change-over device during said communication mode, in accordance with said predetermined communication protocol.

8. The vehicle laser radar system as claimed in claim 6, wherein said signal reception data calculating means comprises:

a second change-over device for receiving a light reception signal from at least one of said light reception sections and for outputting a signal representing an intensity of received light;

a distance calculating device, connected to said second change-over device, for obtaining a distance measurement based upon said signal supplied from said second change-over device during said distance measurement mode and said reference signal supplied to said distance calculating device from said first one of said light emitting sections via said second change-over device; and a communication data receiving device, connected to said second change-over device, for obtaining said communication data from said signal, supplied from said second change-over device during said communication mode, in accordance with said predetermined communication protocol.

\* \* \* \* \*